Oct. 11, 1938.  C. A. RICH  2,132,880
BELT SHIFTING APPARATUS
Filed March 6, 1936  3 Sheets-Sheet 1
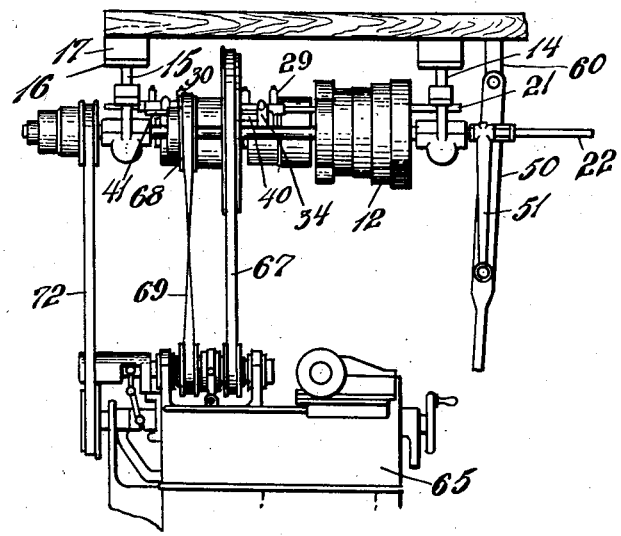
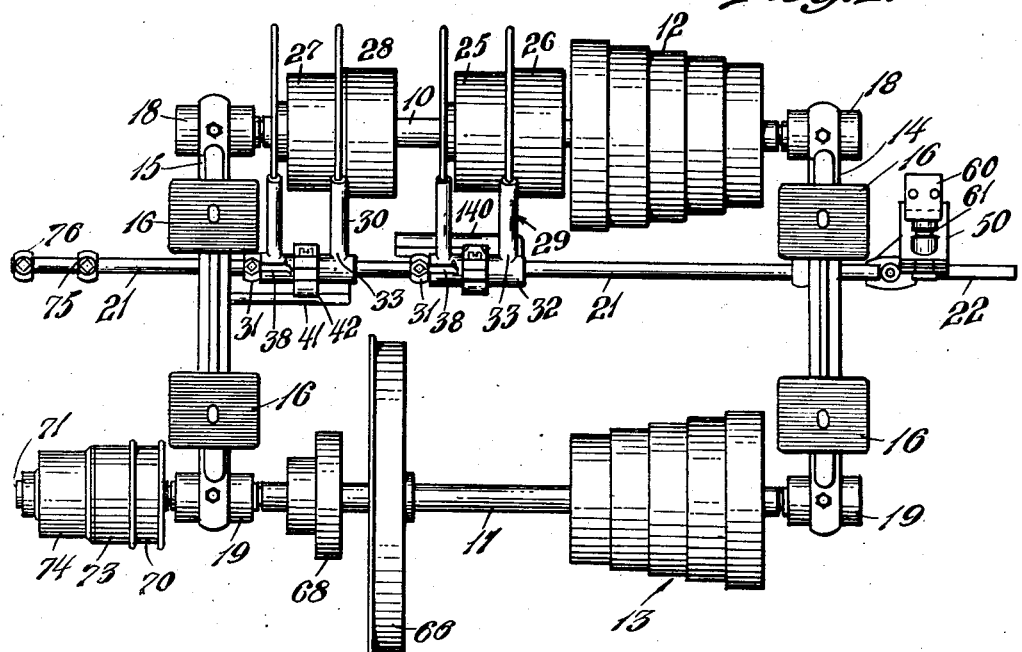
INVENTOR.
Charles A. Rich
BY Barlow & Barlow
ATTORNEYS.

Oct. 11, 1938.     C. A. RICH     2,132,880
BELT SHIFTING APPARATUS
Filed March 6, 1936     3 Sheets—Sheet 2
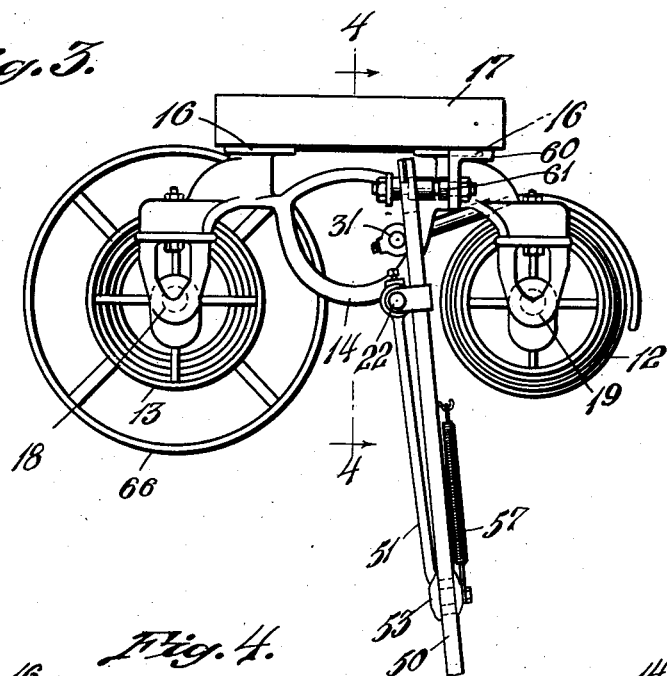
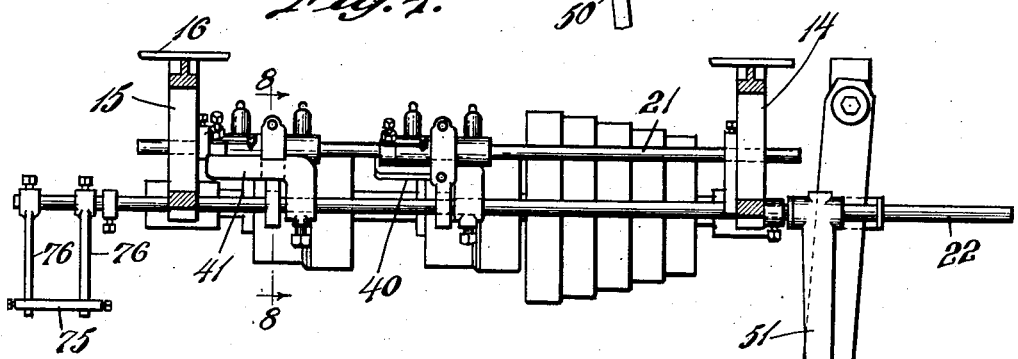
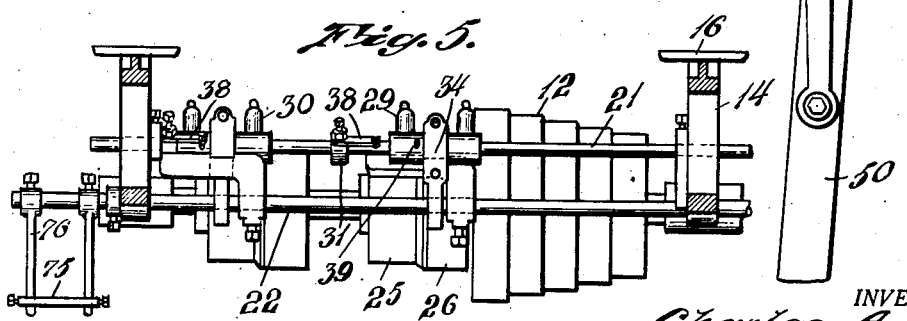
INVENTOR.
Charles A. Rich
BY Barlow & Barlow
ATTORNEYS.

Oct. 11, 1938.   C. A. RICH   2,132,880
BELT SHIFTING APPARATUS
Filed March 6, 1936   3 Sheets-Sheet 3
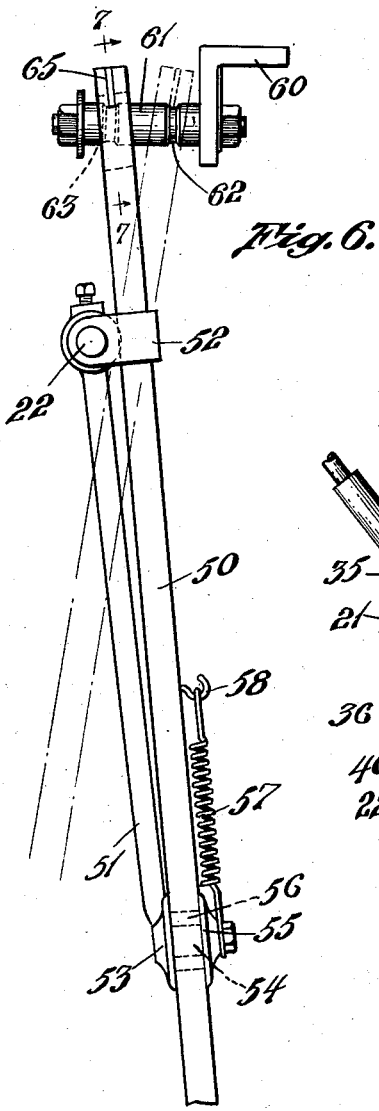
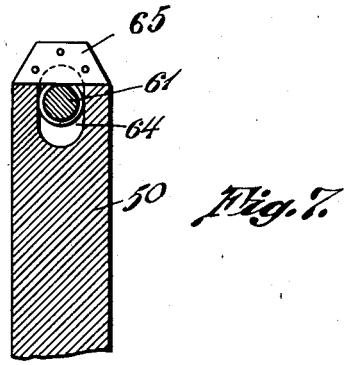
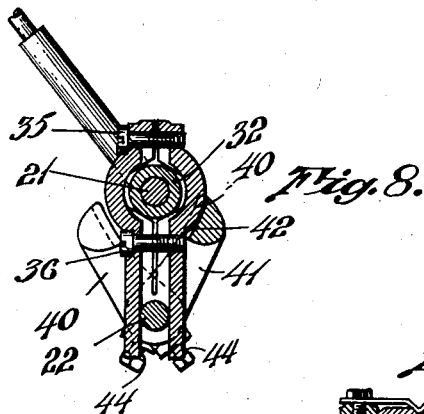
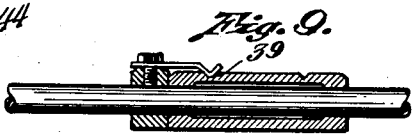
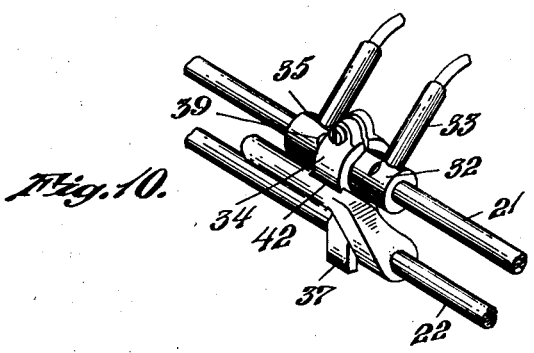
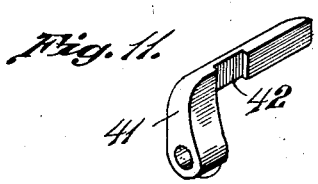
INVENTOR.
Charles A. Rich
BY Barlow & Barlow
ATTORNEYS.

Patented Oct. 11, 1938

2,132,880

UNITED STATES PATENT OFFICE 2,132,880

BELT SHIFTING APPARATUS

Charles A. Rich, Providence, R. I., assignor to Brown & Sharpe Manufacturing Company, a corporation of Rhode Island Application March 6, 1936, Serial No. 67,480

16 Claims. (Cl. 74—242.1)

This invention relates to a belt shifting apparatus, and has for one of its objects the provision of means for selecting and shifting either one of a plurality of belts by manipulation of the control lever and thereby avoiding the necessity of climbing up to rearrange the operating parts of the overhead mechanism.

Another object of the invention is the provision of an arrangement whereby one of three belts is always shifted when either one of the other two belts is selected and shifted, while maintaining the guide for the belt not shifted in a position to retain the belt not shifted on its loose pulley.

Another object of the invention is to maintain each of the belt guides in engagement with its belt at all times regardless of the selection or position of shifting of the parts of the apparatus.

Another object of the invention is the selecting of the desired belt to be shifted by a movement of the control lever in one plane while leaving the control lever operative in a different plane for the actual shifting of the belt selected from one position to another.

With these and other objects in view, the invention consists of certain novel features of construction, as will be more fully described, and particularly pointed out in the appended claims.

In the accompanying drawings:

Fig. 1 is an elevation of a machine such for instance as a screw machine showing the overhead drive therefor;

Fig. 2 is a top plan view looking down on the overhead works which are utilized for providing different speeds in driving the machine;

Fig. 3 is an end view of the overhead works;

Fig. 4 is a sectional view on line 4—4 of Fig. 3, looking in the direction of the arrow;

Fig. 5 is a view similar to Fig. 4 with the parts shifted to a different position;

Fig. 6 is a detail of the control member or shipper lever and its manner of mounting;

Fig. 7 is a sectional view on line 7—7 of Fig. 6, showing a fragmental upper portion of the shipper lever;

Fig. 8 is a sectional view on line 8—8 of Fig. 4;

Fig. 9 is a detail view showing the manner of retaining the shipper mechanism against sliding when the shipper rod is moved;

Fig. 10 is a perspective view of the belt guide and its mounting;

Fig. 11 is a perspective view of one of the arms for selectively engaging the belt guide.

In driving certain machines such as screw machines, a plurality of different speeds are desired for the work. Different speeds may be obtained by step pulleys with a belt movable from one position to another and then by driving the shaft upon which one of these step pulleys is mounted at different speeds another series or range may be provided, it being usual to provide two speeds for the driving set of step pulleys, the arrangement being such that by climbing up to the overhead works and making an adjustment the different drive of the driven pulley may be accomplished while using the shipper lever in the same manner. Climbing overhead and making this adjustment consumes some little time and is awkward to perform; and in order that the operator may avoid this climbing overhead to make such an adjustment and rather may control the entire range of operation of the overhead works from the shipper lever, I have so arranged the mechanism that by moving the lower end of the shipper lever either forwardly or backwardly I may select the desired belt and consequently the speed for the driven step pulley, the shipper lever otherwise operating in the same manner as heretofore, and thus it becomes unnecessary to climb up to the overhead works to make the adjustments which has heretofore been necessary in order to accomplish this result; and the following is a more detailed description of the present embodiment of this invention, illustrating the preferred means by which these advantageous results may be accomplished:

With reference to the drawings, particularly Fig. 2, 10 designates the driving countershaft and 11 the driven countershaft from which power is supplied to the machine to be operated. Upon the driving countershaft 10 there is a step pulley 12 which drives step pulley 13 on the driven shaft 11, thus, it will be apparent that by shifting the belt from one section to another various speeds may be obtained.

The countershafts 10 and 11 are supported by means of brackets 14 and 15 having attaching plates 16 secured to overhead beams 17, shown in Figs. 1 and 3. These brackets 14 and 15 provide bearings 18 for the countershaft 10 and 19 for the countershaft 11, while they also provide openings for mounting and guiding the shipper rod 22 which is axially slidable in these guide openings and is also rockable in these guide openings as a bearing. The auxiliary shipper rod 21 is fixedly mounted in these brackets 14 and 15 vertically above the rod 22.

Upon the driving countershaft 10 there is mounted a loose pulley 25 and tight pulley 26 as one set, and a loose pulley 27 and a tight pulley 28 as another set, each of which sets are driven at different speeds by belts, not shown. The belt guides for each of these sets, however, are designated generally 29 and 30 and each consists of tubular slide member 32 with a pair of arms 33 arranged something in the manner of a fork to extend along either side of the belt and guide the belt from one pulley to another as the fork is shifted. These belt guides 29 and 30 are slidably mounted upon the auxiliary shipper rod shaft 21 while the split member 34 is clamped about each tube 32 by bolts 35 and 36 with its bifurcated portions 37 engaging opposite sides of the shipper rod 22. A spring detent 38 fixed on shaft 21 by adjustable collar 31 engages in a notch 39 in the slide 32 for releasably holding the belt guide in a position for retaining the belt on the loose pulley.

Upon shipper rod 22 there are mounted a pair of L-shaped arms 40 and 41 each having a notch 42 therein, which arms are held in fixed relation to the shipper rod 22 by means of their set screws 44. The relation of these shipper arms is such that one is at an angle to the other, as shown in Fig. 8. When the belt guides are both in a position for directing the belt on the loose pulley the notches of these arms will be respectively opposite the members 34 of the belt guides and either belt guide may be engaged by rocking the shipper rod 22 about its axis, that is, by rotating the shipper rod in a clock-wise direction as viewed in Fig. 8, the arm 40 will be moved into engagement with the portion 34 of the belt guide, while if a counterclock-wise direction is given the shipper rod 22 the arm 41 will be moved into engagement with the portion 34 of the guide 30 and the opposite arm 40 will be free; thus, upon axial movement of the shipper rod 22 when one of the arms engages a belt guide one only of the guides 29 or 30 will be moved while the other guide will be free and retained in its position by reason of its spring detent, above described, this spring detent being such as to be released upon positive engagement of the guide for movement.

The shipper rod 22 is operated by a control member or shipper lever 50. An arm 51 is fixed upon the shipper rod 22 and is provided with a U-shaped projection 52 through which the lever 50 extends, while at its lower end the arm 51 is provided with a plate 53 having a stud 54 extending therefrom and holding a plate 55 in spaced relation to the plate 53. Between these plates the control member 50 extends with a slot 56 therein receiving the stud 54 to permit of movement longitudinally of the member 50 relative to the arm 51. A spring 57 engages the stud 54 and a hook 58 on the member 50 tends to draw the control member 50 downwardly with reference to the arm 51 and through the U-shaped guide 53.

A bracket 60 is fastened overhead and provides a mounting for a stud 61 which projects outwardly therefrom. This stud is mounted in the bracket 60 by any suitable means and has grooves 62 and 63 therein. The upper end of the control member 50 is provided with a slot 64 for the reception of the stud 61. A blade 65 which is set into the end of the lever may be received in either groove 62 or 63 to retain the lever in two different positions when the latter is swung about the shipper rod 22 as an axis. The stud 61 acts as a pivot axis for swinging the shipper lever 50 to slide the shipper rod 22 axially. When the shipper lever is in the position shown in Fig. 6 the arm 40 will engage the guide 29 for shifting the belt from pulley 25 to pulley 26, while the arm 41 will be free of guide 30 so that it will be held by detent 38 in the position shown in Figs. 2 and 4.

If it is desired to operate the other belt which engages pulleys 27 and 28, the shipper lever will be pulled forwardly from the full line position of Fig. 6 to the dotted line position of this figure to rock the shipper rod 22 about its own axis which is accomplished by the control member 50 being forced upwardly to disengage the blade 65 from its groove 63 after which it may be moved about the axis of the rod 22 as a pivot until above the groove 62 so that upon release the lever 50 will drop to locate the blade in the groove 62 which will move arm 41 into engagement with guide 30, after which the lever may be rocked about the stud 60 as a pivot to slide the shipper rod 22 axially for shifting the belt from pulley 27 to pulley 28.

The work in the machine 65 is driven forwardly by the pulley 66 and belt 67 or in reverse by pulley 68 and belt 69; while the cam shaft of the machine is driven from pulley 70 on a separate shaft 71 by belt 72. The pulley 70 is controlled by the tight pulley 73 having a companion loose pulley 74 by a belt not shown; and in order that I may shift the belt from pulley 74 to pulley 73 at the time of selecting and shifting either one of the belt guides 29 or 30 I provide another belt guide 75 comprising a pair of arms 76 fixed on the shipper rod 22 to move with this shipper rod at all times for shifting the belt in this connection regardless of which of the other guides is selected for operation.

By this arrangement I may select either belt guide 29 or 30 by moving the handle end of the shipper lever forward or back and then by pivoting the lever about the stud 61 I may move the shipper rod in the usual manner for shifting the belt guide as desired.

The foregoing description is directed solely towards the construction illustrated, but I desire it to be understood that I reserve the privilege of resorting to all the mechanical changes to which the device is susceptible, the invention being defined and limited only by the terms of the appended claims.

I claim:

1. In a belt shifting apparatus for a pair of belts, a belt guide for each belt, a shipper lever, and means operable upon movement of the shipper lever comprising a single rod through which all movement is transmitted for selecting and moving one of said guides without moving the other, said means being adapted for rocking movement for engaging the guide selected.

2. In a belt shifting apparatus for a pair of belts, a belt guide for each belt, a shipper lever, means for mounting said lever for movement in two planes at a substantial angle to each other, and mechanism connecting said lever to said guides for selecting the desired guide upon movement of the lever in one plane and for shifting said selected guide upon movement of the lever in the other plane, said mechanism when in position to operate one guide being free from the other guide.

3. In a belt shifting apparatus for a pair of belts, a belt guide for each belt, a shipper lever, means for mounting said lever for movement in two planes at a substantial angle to each other, means for connecting said lever to said guides including a rod for transmitting all movement for selecting and moving one of said guides, and releasable means for holding the guide not selected in position during movement of the other guide.

4. In a belt shifting apparatus for a pair of belts, a belt guide for each belt, a shipper lever, means for mounting said lever for movement in two planes at substantially right angles to each other, means for connecting said lever to said guides including a single rod for transmitting all movement for selecting and moving one of said guides.

5. In a belt shifting apparatus, a countershaft, two sets of pulleys thereon, each of said sets consisting of a tight and a loose pulley, a belt for each pulley set, a belt guide for each belt, a shipper lever, means for mounting said lever for movement in two planes at substantially right angles to each other, means for connecting said lever to said guides including a single rod for selecting and moving one of said guides, and a spring detent engageable with each of said guides to hold it in a position for holding each of said belts on the loose pulley until positively moved therefrom by said means.

6. In a belt shifting apparatus for a pair of belts, a belt guide for each belt, a shipper lever, means for mounting said lever for movement in two planes at substantially right angles to each other, means for connecting said lever to said guides including a single rod for selecting and moving one of said guides without moving the other, said means being so arranged that one of said belts is shifted regardless of the selected position.

7. In a belt shifting apparatus, three belt shifting guides, means for shifting one of said guides including a common shaft for selectively shifting therewith either one of the other two guides, and resilient means fixedly mounted on the shaft for releasably holding the selective guides in definite position until selected and positively moved.

8. In a belt shifting apparatus, three belt shifting guides, a control member mounted for movement in two different planes, means for selecting one of said guides upon a movement of the control member in one plane and moving it upon a movement of the control member in another plane, said means also serving to move another one of said guides regardless of the first guide selected, whereby two guides are moved and one is stationary.

9. In a belt shifting apparatus, three belt shifting guides, a control member mounted for movement in two different planes, means for selecting one of said guides upon a movement of the control member in one plane and moving it upon a movement of the control member in another plane, said means also serving to move another one of said guides regardless of the first guide selected, whereby two guides are moved and one is stationary, and resilient means for holding the guides in position until positively moved.

10. In a belt shifting apparatus for a pair of belts, a pair of guides one for each belt, a shipper rod, an arm carried by said rod for engaging one of said guides when the rod is in one position and a second arm carried by said rod and angularly disposed with respect to the first arm for engaging the other guide when the arm is in another position, said arms being so arranged on said rod so that when one arm engages the guide the other arm is free from its guide, and means for moving said shipper rod for selective operation of said guides.

11. In a belt shifting apparatus for a pair of belts, a pair of guides one for each belt, means on which said guides are slidably supported, an axially slidable and rotatably rockable shipper rod underlying said means, an arm carried by said rod for engaging one of said guides when the rod is in one rotative position and a second arm carried by said rod for engaging the other guide when the arm is in another different rotative position, said arms being so arranged on said rod that when one arm engages the guide the other arm is free from its guide, and a lever mounted to effect a rockable and axial movement of said rod for moving said shipper rod for selective operation of said guides.

12. In a belt shifting apparatus for a pair of belts, a pair of guides one for each belt, a shipper rod, an arm carried by said rod for engaging one of said guides when the rod is in one position and a second arm carried by said rod for engaging the other guide when the arm is in another position, said arms being so arranged on said rod that when one arm engages the guide the other arm is free from its guide, a lever movable about the said rod as an axis to rock the rod and arms from one position to another, and means engageable by said lever in either position to pivot it for swinging in a different plane to axially shift said rod.

13. In a belt shifting apparatus for a pair of belts, a pair of guides one for each belt, a shipper rod, an arm carried by said rod for engaging one of said guides when the rod is in one position and a second arm carried by said rod for engaging the other guide when the arm is in another position, said arms being so arranged on said rod that when one arm engages the guide the other arm is free from its guide, a lever movable about the said rod as an axis to rock the rod and arms from one position to another, and means engageable by said lever in either position to lock it in such selected position and pivot it for swinging in a different plane to axially shift said rod.

14. In a belt shifting apparatus for a pair of belts, a pair of guides one for each belt, a shipper rod, an arm carried by said rod for engaging one of said guides when the rod is in one position and a second arm carried by said rod for engaging the other guide when the arm is in another position, said arms being so arranged on said rod that when one arm engages the guide the other arm is free from its guide, a lever movable about the said rod as an axis to rock the rod and arms from one position to another, means engageable by said lever in either position to lock it in such selected position and pivot it for swinging in a different plane to axially shift said rod, comprising a stud with spaced recesses therein, and a blade on said lever engageable with either of said recesses to effect a pivot point for the lever.

15. In a belt shifting apparatus for a pair of belts, a belt guide for each belt, a shipper lever, and means for selecting and moving one of said guides without moving the other, said means being arranged so as to be free from the guide not selected when positioned for moving the selected guide, said belt guides and said means being movable in the same direction for shifting the belts.

16. In a belt shifting apparatus for three belts, three belt shifting guides, a control member, means actuated by said control member for selectively shifting either one of two of said guides, and means operated by said means for operating the third guide when either of the other guides is shifted.

CHARLES A. RICH.